United States Patent
Bragstad et al.

(10) Patent No.: US 9,680,729 B2
(45) Date of Patent: *Jun. 13, 2017

(54) DEPLOYING OPERATORS OF A STREAMING APPLICATION BASED ON PHYSICAL LOCATION ATTRIBUTES OF A VIRTUAL MACHINE

(71) Applicant: International Business Machines Corporation, Armonk, NY (US)

(72) Inventors: Lance Bragstad, Pine Island, MN (US); Michael J. Branson, Rochester, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 403 days.

This patent is subject to a terminal disclaimer.

(21) Appl. No.: 14/277,530

(22) Filed: May 14, 2014

(65) Prior Publication Data
US 2015/0256439 A1    Sep. 10, 2015

Related U.S. Application Data

(63) Continuation of application No. 14/199,190, filed on Mar. 6, 2014.

(51) Int. Cl.
*G06F 15/173* (2006.01)
*H04L 12/26* (2006.01)
(Continued)

(52) U.S. Cl.
CPC .......... *H04L 43/16* (2013.01); *H04L 43/0876* (2013.01); *H04L 65/80* (2013.01);
(Continued)

(58) Field of Classification Search
CPC ............. G06F 17/30516; G06F 9/5083; G06F 17/30454; H04N 21/4437
See application file for complete search history.

(56) References Cited

U.S. PATENT DOCUMENTS

2001/0034795 A1* 10/2001 Moulton ............. H04L 67/1097
                                                            709/244
2008/0104587 A1*  5/2008 Magenheimer ....... G06F 1/3203
                                                            718/1
(Continued)

FOREIGN PATENT DOCUMENTS

WO    2013119926 A1    8/2013
WO    2013142210 A1    9/2013

OTHER PUBLICATIONS

Hewlett Packard, "Innovating for the environment: Data centers", web page at http://www.hpi.hp.com/environment/datacenters/html/#job, printed Feb. 24, 2014.

(Continued)

*Primary Examiner* — Shean Tokuta
(74) *Attorney, Agent, or Firm* — Martin & Associates, LLC; Bret J. Petersen

(57) ABSTRACT

A streams manager monitors operator performance of a streaming application to determine when the performance of an operator needs to be improved or optimized. The streams manager in conjunction with a cloud manager automatically determines one or more preferred virtual machines in a cloud with a specified streams infrastructure that best meet the needs of the underperforming operator or application component based on physical location attributes of the preferred virtual machines. The cloud manager determines the physical location attributes of the candidate virtual machines. The streams manager or the cloud manager can then determine a preferred virtual machine of the candidates to deploy the operator based on the physical location attri- (Continued)

butes. The streams manager then modifies the flow graph so one or more operators of the streaming application are deployed to a preferred virtual machine determined according to the physical location attributes of the preferred virtual machine.

3 Claims, 11 Drawing Sheets

(51) Int. Cl.
*H04L 29/06* (2006.01)
*H04L 29/08* (2006.01)

(52) U.S. Cl.
CPC ...... *H04L 67/1004* (2013.01); *H04L 67/1012* (2013.01); *H04L 67/38* (2013.01)

(56) References Cited

U.S. PATENT DOCUMENTS

| | | | | |
|---|---|---|---|---|
| 2009/0319687 | A1* | 12/2009 | Goldstein | G06F 9/5083 709/241 |
| 2011/0016214 | A1 | 1/2011 | Jackson | |
| 2011/0131578 | A1* | 6/2011 | Takagi | G06F 9/5038 718/100 |
| 2012/0137178 | A1* | 5/2012 | Barsness | G06F 11/362 714/35 |
| 2012/0303740 | A1* | 11/2012 | Ferris | G06F 17/30194 709/217 |
| 2013/0305242 | A1* | 11/2013 | Wang | G06F 9/45558 718/1 |
| 2013/0346390 | A1* | 12/2013 | Jerzak | G06F 17/30103 707/719 |
| 2014/0053226 | A1* | 2/2014 | Fadida | H04L 67/34 726/1 |
| 2014/0282520 | A1* | 9/2014 | Sabharwal | G06F 9/455 718/1 |
| 2015/0040127 | A1* | 2/2015 | Dippenaar | G06F 9/4856 718/1 |

OTHER PUBLICATIONS

DST, SPI, "3480 Migration Guide for MVS, VSE, and VM Installations", ip.com No. IPCOM000148468D, Apr. 30, 1988.
Gauthier, David, "Microsoft Data Centers Blog: Microsoft Could-Scale Data Center designs", web page at http://www.globalfoundationservices/com/posts/2013/march/26/microsoft-cloud-scale-data-center-designs.aspx, Mar. 26, 2013.
IBM, "Migrating from VTAM 3.4 to VTAM 4.2 with APPN Support for VSE/ESA and VM/ESA", Jul. 1996.

* cited by examiner

1000

| Physical Location Attributes of VMs |
|---|
| Climate for Location – Cold, Hot, Mild |
| Average Cooling Cost |
| Current Cooling Cost |
| Data Regulation Environment |
| Processing Performance |
| I/O Performance |
| Reliability Performance |
| Security |
| Peak Demand Utilization |

Physical Location Attributes Table

| Location ID (1112) | Fixed Attribute (1114) | Dynamic Attribute (1116) |
|---|---|---|
| VMID1 | Cold Climate | Current Cost |
| VMID2 | Warm Climate | |
| VMID3 | Sensitive Data Local | |
| VMID4 | High I/O Performance | Available |
| VMID5 | High Security | Available |
| VMID6 | Peak Demand | Low Utilization |

1118 — VMID1 row
1120 — VMID4 row
1122 — VMID5 row
1124 — VMID6 row

DEPLOYING OPERATORS OF A STREAMING APPLICATION BASED ON PHYSICAL LOCATION ATTRIBUTES OF A VIRTUAL MACHINE

BACKGROUND

1. Technical Field

This disclosure generally relates to streaming applications, and more specifically relates enhancing performance of a steaming application by migrating or deploying operators of the streaming application to virtual machines according to physical location attributes of a virtual machine.

2. Background Art

Streaming applications are known in the art, and typically include multiple operators coupled together in a flow graph that process streaming data in near real-time. An operator typically takes in streaming data in the form of data tuples, operates on the tuples in some fashion, and outputs the processed tuples to the next operator. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

BRIEF SUMMARY

A streams manager monitors operator performance of a streaming application to determine when the performance of an operator needs to be improved or optimized. The streams manager in conjunction with a cloud manager automatically determines one or more preferred virtual machines (VMs) in a cloud with a specified streams infrastructure that best meet the needs of the underperforming operator or application component based on physical location attributes of the preferred virtual machines. The cloud manager determines the physical location attributes of the candidate virtual machines. The streams manager or the cloud manager can then make the determination of a preferred virtual machine of the candidates to deploy the operator based on the physical location attributes. The streams manager then modifies the flow graph so one or more operators of the streaming application are deployed to a preferred virtual machine determined according to the physical location attributes of the preferred virtual machine.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 10 is a list of examples of physical location attributes used by the cloud manager to determine a physical location to provision virtual machines for a streaming application;

FIG. 11 is a block diagram that represents an example of a physical location attributes table;

DETAILED DESCRIPTION

Figure 1:
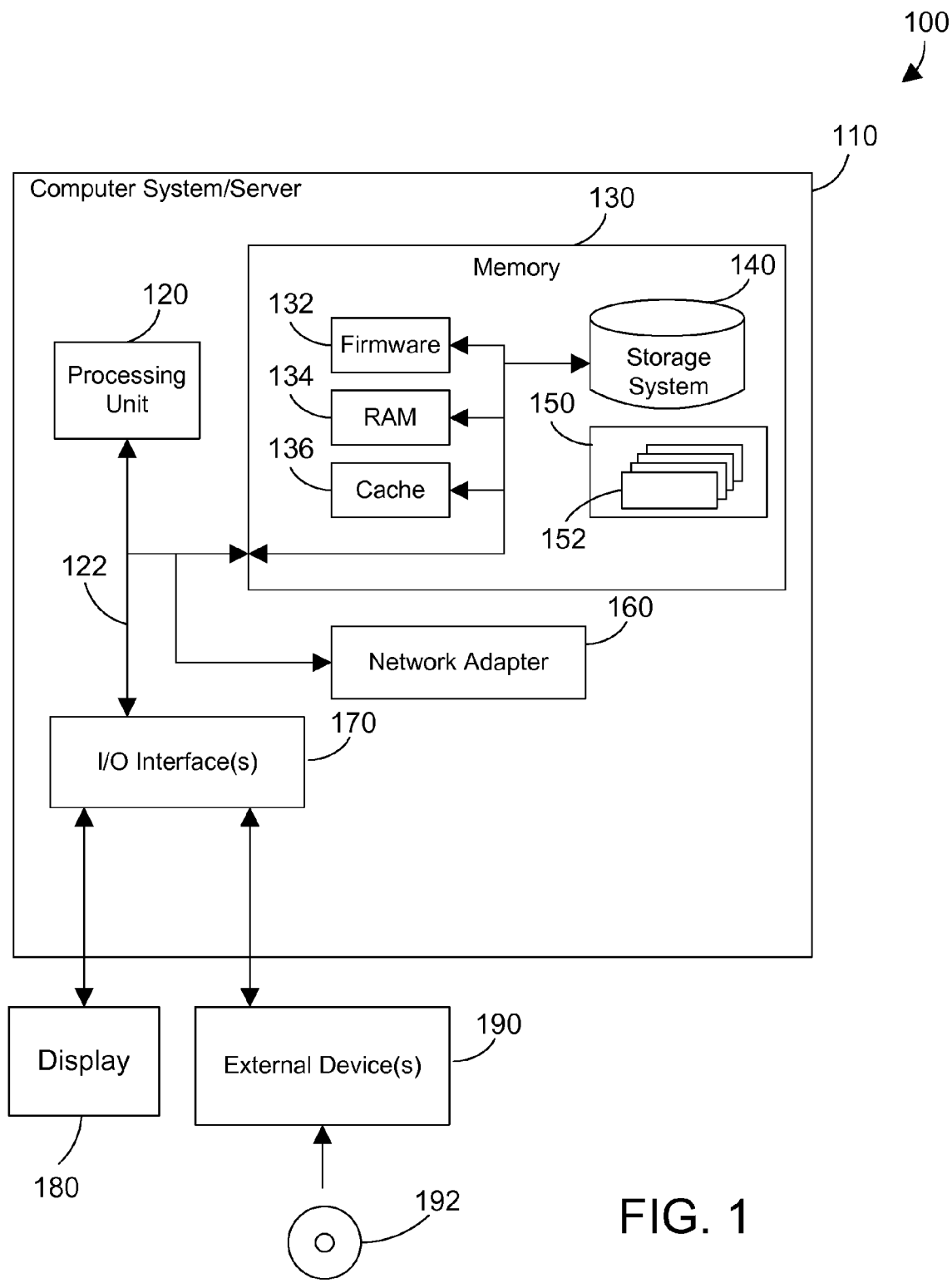
FIG. 1 is a block diagram of a cloud computing node.

The disclosure and claims herein relate to a streams manager that monitors operator performance of a streaming application to determine when the performance of an operator needs to be improved or optimized. The streams manager in conjunction with a cloud manager automatically determines one or more preferred virtual machines in a cloud with a specified streams infrastructure that best meet the needs of the underperforming operator or application component based on physical location attributes of the preferred virtual machines. The cloud manager determines the physical location attributes of the candidate virtual machines. In the described examples, the streams manager or the cloud manager then makes the determination of a preferred VM of the candidates to deploy the operator based on the physical location attributes. The streams manager then modifies the flow graph so one or more operators of the streaming application are deployed to a preferred virtual machine determined according to the physical location attributes of the preferred virtual machine.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
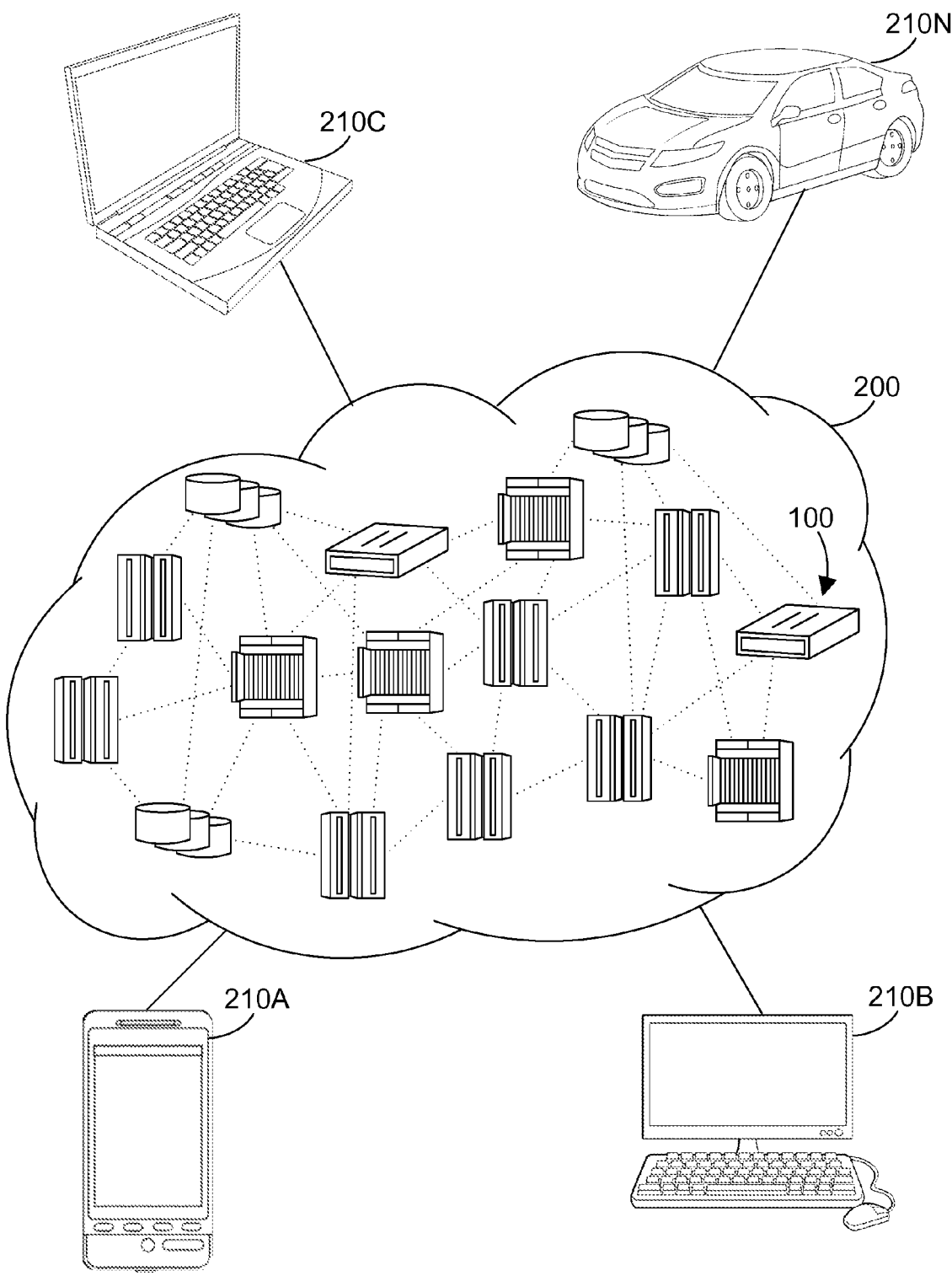
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
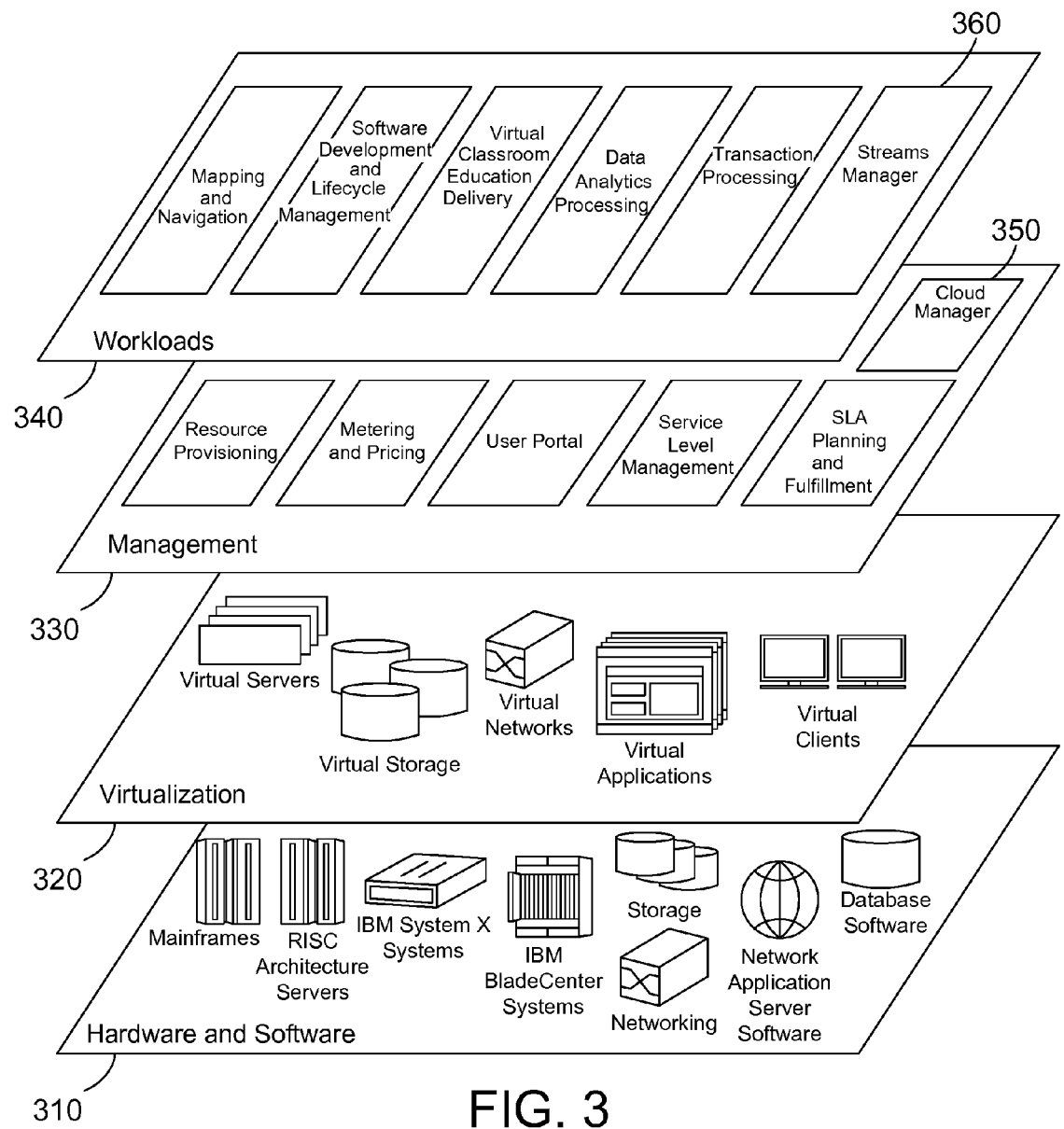
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager as described in more detail below. While the cloud manager 350 is shown in FIG. 3 to reside in the management layer 330, cloud manager 350 can span all of the levels shown in FIG. 3, as discussed in detail below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a streams manager 360, as discussed in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
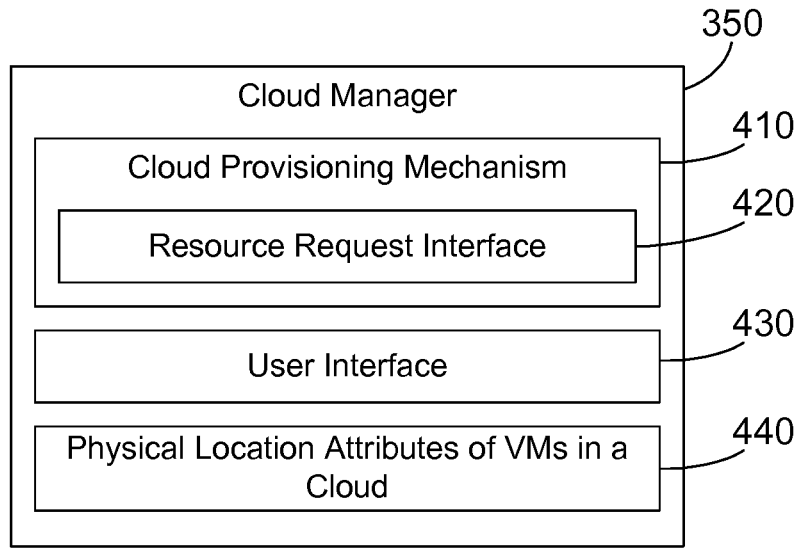
FIG. 4 is a block diagram showing some features of a cloud manager.

FIG. 4 shows one suitable example of the cloud manager 350 shown in FIG. 3. The cloud manager 350 includes a cloud provisioning mechanism 410 that includes a resource request interface 420. The resource request interface 420 allows a software entity, such as the streams manager 360, to request virtual machines from the cloud manager 350 without human intervention. The cloud manager 350 also includes a user interface 430 that allows a user to interact with the cloud manager to perform any suitable function, including provisioning of VMs, destruction of VMs, performance analysis of the cloud, etc. The difference between the resource request interface 420 and the user interface 430 is a user must manually use the user interface 430 to perform functions specified by the user, while the resource request interface 420 may be used by a software entity to request provisioning of cloud resources by the cloud mechanism 350 without input from a human user. The cloud manager 350 also includes physical location attributes of VMs 440 located at various physical locations in the cloud as described further below. Of course, cloud manager 350 could include many other features and functions known in the art that are not shown in FIG. 4.

Figure 5:
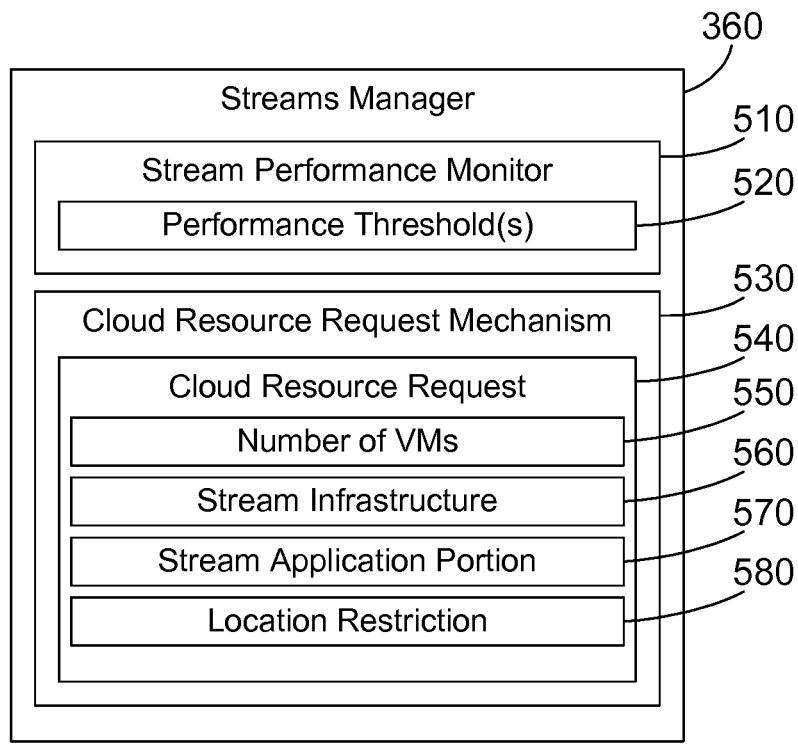
FIG. 5 is a block diagram showing some features of a streams manager.

FIG. 5 shows one suitable example of the streams manager 360 shown in FIG. 3. The streams manager 360 is software that manages one or more streaming applications, including creating operators and data flow connections between operators in a flow graph that represents a streaming application. The streams manager 360 includes a performance monitor 510 with one or more performance thresholds 520. Performance thresholds 520 can include static thresholds, such as percentage used of current capacity or tuple rate, and can also include any suitable heuristic for measuring performance of a streaming application as a whole or for measuring performance of one or more operators in a streaming application. Performance thresholds 520 may include different thresholds and metrics at the operator level, at the level of a group of operators, and/or at the level of the overall performance of the streaming application. The stream performance monitor 510 monitors performance of a streaming application, and when current performance compared to the one or more performance thresholds 520 indicates current performance needs to be improved, the stream performance monitor 510 communicates the need for resources to the cloud resource request mechanism 530. The cloud resource request mechanism 530, in response to the communication from the stream performance monitor, assembles a cloud resource request 530, which can include information such as a number of VMs to provision 550, stream infrastructure needed in each VM 560, a stream application portion 570 for each VM, and a location restriction 580. The location restriction 580 give input for the cloud manger to determine a preferred candidate VM based on physical location attributes. Once the cloud resource request 530 is formulated, the streams manager 360 submits the cloud resource request 530 to a cloud manager, such as cloud manager 350 shown in FIGS. 3 and 4.

The cloud resource request can be formatted in any suitable way. A simple example will illustrate two suitable ways for formatting a cloud resource request. Let's assume the streams manager determines it needs two VMs, where both have common stream infrastructure, with a first of the VMs hosting operator A and the second of the VMs hosting operator B. The cloud resource request 540 in FIG. 5 could specify two VMs at 550, could specify the common stream infrastructure, such as an operating system and middleware, at 560, and could specify operator A and operator B at 570. In response, the cloud manager would provision two VMs with the common stream infrastructure, with the first of the VMs hosting operator A and the second of the VMs hosting operator B. In the alternative, the cloud resource request 540 could be formulated such that each VM is specified with its corresponding stream infrastructure and stream application portion. In this configuration, the cloud resource request would specify a first VM with the common stream infrastructure and operator A, and a second VM with the common stream infrastructure and operator B.

Figure 6:
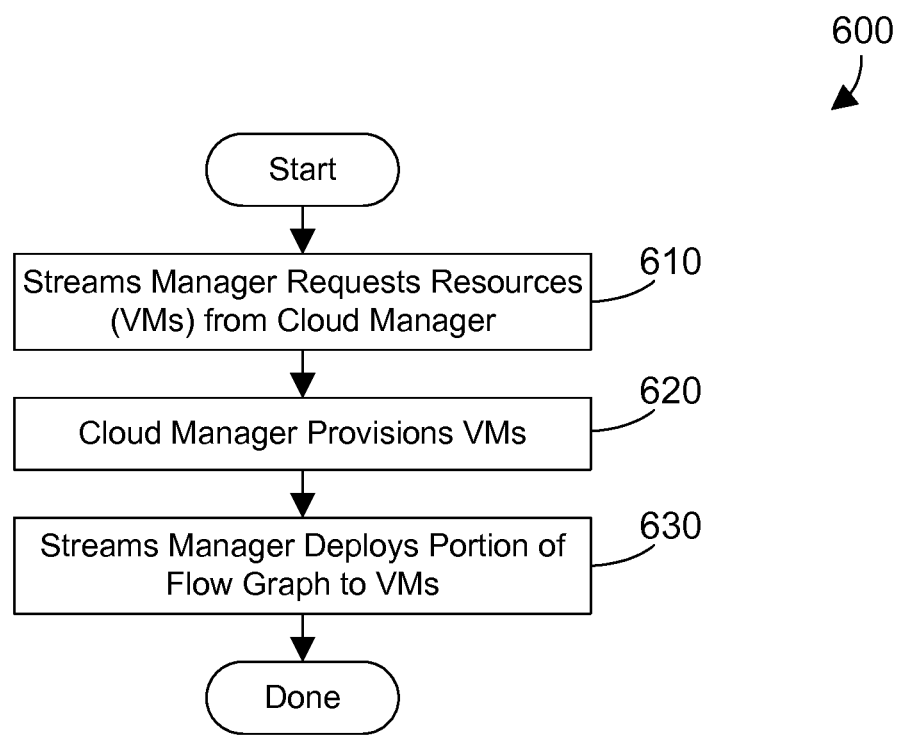
FIG. 6 is a flow diagram of a method for a streams manager to request and receive from a cloud manager virtual machines to improve performance of a streaming application.

Referring to FIG. 6, a method 600 shows one suitable example for enhancing performance of a streaming application, and is preferably performed by the streams manager 360 interacting with the cloud manager 350. The streams manager requests resources, such a VMs, from the cloud manager (step 610). The cloud manager provisions the VMs (step 620). The streams manager then deploys a portion of the flow graph to the VMs (step 630). When the streaming application is not initially hosted in the cloud, the result will be a hybrid implementation of the streams application, with some portions hosted on a dedicated computer system and other portions hosted by one or more VMs in the cloud.

Figure 7:
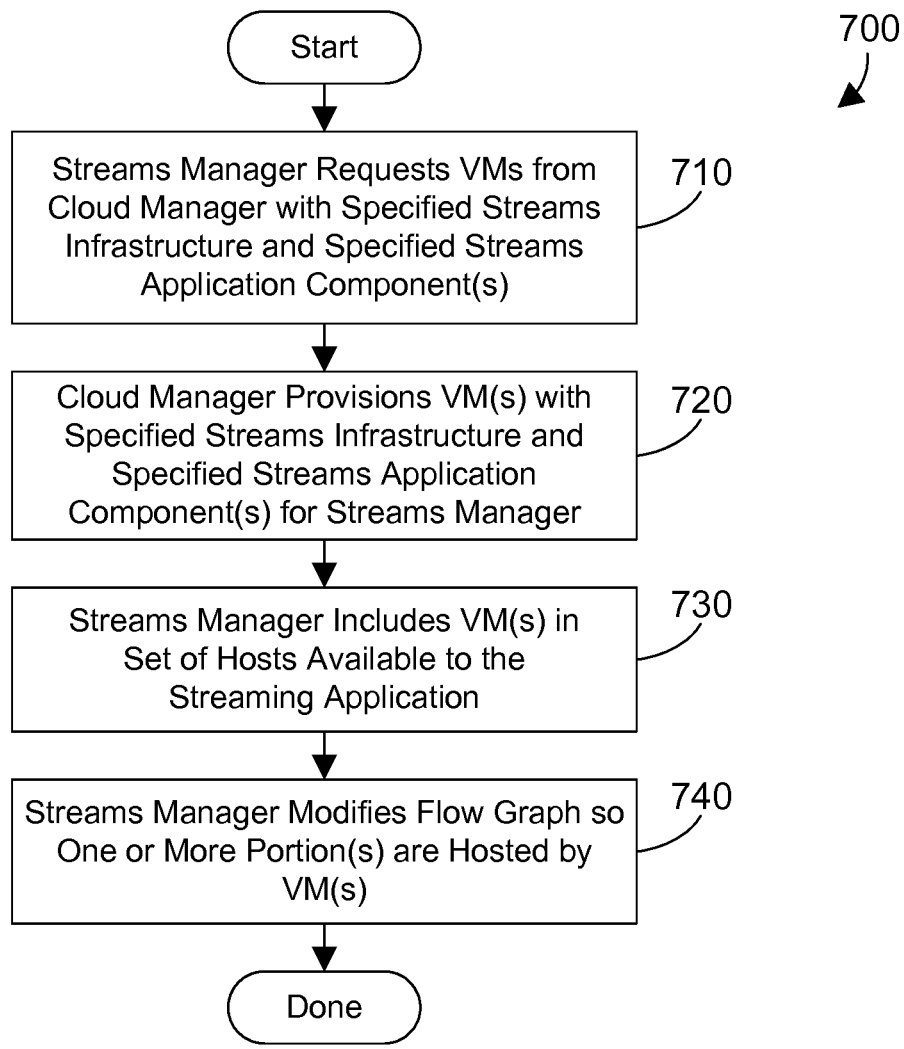
FIG. 7 is a flow diagram of a specific method in accordance with method 600 in FIG. 6 for a streams manager to request and receive from a cloud manager virtual machines to improve performance of a streaming application.

FIG. 7 shows one suitable example of a more specific method 700 for enhancing performance of a streaming application. Note that method 700 could be one specific implementation for method 600 shown in FIG. 6. The streams manager requests a specified number of VMs from the cloud manager with specified streams infrastructure and one or more specified streams application components (step 710). The term "streams infrastructure" as used herein includes any software that is needed to run a component in the streaming application, such as an operating system and middleware that supports executing components in a streaming application. The term "streams application component" can include any component in a streaming application, including operators. The cloud manager provisions the VMs with the specified streams infrastructure and the one or more specified streams application components in response to the request from the streams manager (step 720). The streams manager includes the VMs in the set of hosts available to the streaming application (step 730). The streams manager then modifies the flow graph so one or more portions of the flow graph are hosted by the one or more VMs provisioned by the cloud manager (step 740).

Figure 8:
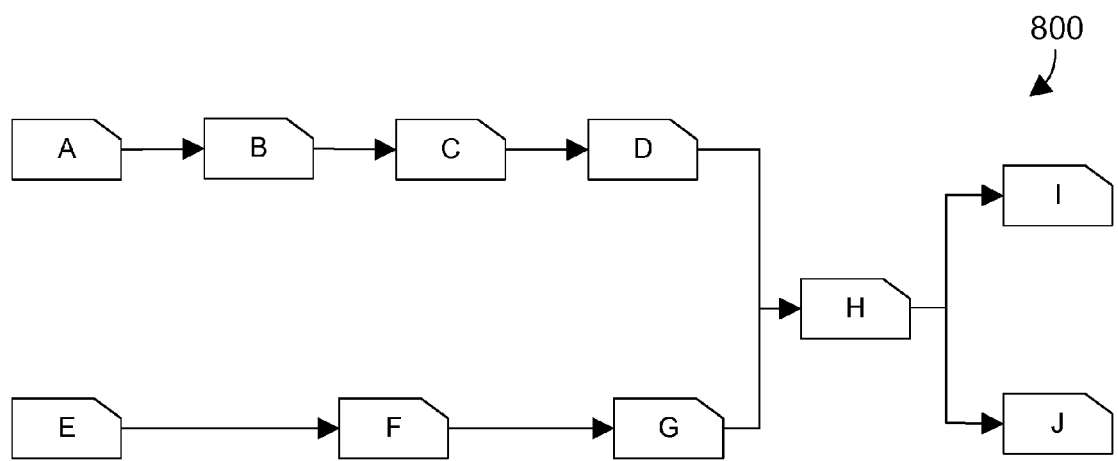
FIG. 8 is a block diagram of one specific example of a streaming application.
Figure 9:
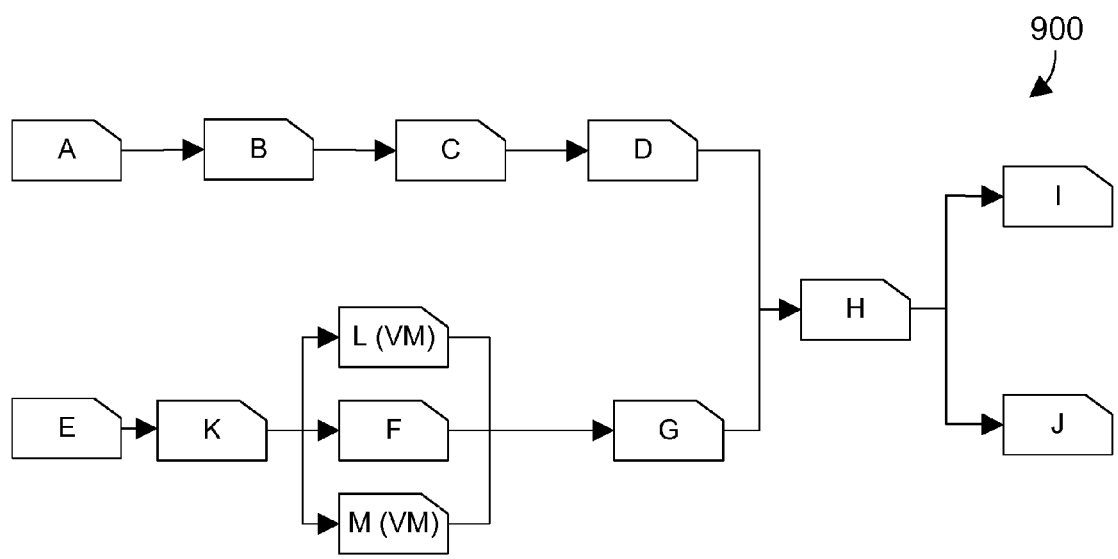
FIG. 9 is a block diagram showing the streaming application in FIG. 8 after the addition of two virtual machines provisioned from a cloud.

A simple example is provided in FIGS. 8 and 9 to illustrate the concepts discussed above. Referring to FIG. 8, a streaming application 800 includes operators A, B, C, D, E, F, G, H, I and J as shown. Operator A originates a stream of tuples, which is processed by operator B, which outputs tuples. The tuples from operator B are processed by operator C, which outputs tuples to operator D, which processes the tuples and outputs its tuples to operator H. In similar fashion, operator E originates a stream of tuples, which is processed by operator F, which outputs tuples that are processed by operator G, which outputs tuples to operator H. Note that operator H receives tuples from both operator D and operator G. Operator H processes the tuples it receives from operator D and from operator G, and outputs its tuples to operators I and J. We assume for this example the streaming application 800 runs on a dedicated system, such as a computer system/server 100 shown in FIG. 1.

The stream performance monitor 510 in FIG. 5 monitors performance of the streaming application 800 in FIG. 8 in accordance with one or more defined performance thresholds 520. An example of a suitable performance threshold 520 is percent of capacity used. A performance threshold of say, 80% could be specified for operator F in FIG. 8. Note a performance threshold can apply to a specified operator, to a specified a group of operators, or to all operators in the streaming application. We assume the streaming application 800 runs with operator F operating at less than 80% capacity, but due to increased demand, the performance of operator F grows to exceed 80% capacity. In response to the performance of operator F exceeding the 80% defined performance threshold, the streams manager requests cloud resources to relieve the load on operator F. For example, the streams manager could request the cloud manager provision two VMs with streams infrastructure that supports running components of the streaming application and with the logic for operator F (step 710 in FIG. 7). In response, the cloud manager provisions two VMs with the specified stream infrastructure and with the logic for operator F (step 720). The streams manager includes the two VMs in the set of hosts available to the streaming application (step 730). The streams manager then modifies the flow graph so one or more portions are hosted by the two VMs just provisioned (step 740). The modifications to the flow graph are shown in the streaming application 900 in FIG. 9 to include a new operator K and new operators L and M that implement the functions of operator F in two different virtual machines and that work in parallel with operator F. Note the new operator K is needed to split the tuples coming from operator E into three sets that are distributed to operators L, F, and M. Note that operators L and M are hosted on the virtual machines in the cloud provisioned by the cloud manager, as indicated by the VM in these operators, while operator F is hosted by a dedicated computer system that runs the rest of the streaming application 900 shown in FIG. 9. The result is a hybrid system, with some operators in the streaming application 900 hosted on the dedicated computer system, with other operators, such as operators L and M, hosted in the cloud.

While the simple example in FIGS. 8 and 9 show two new operators L and M that implement the function of operator F, this is not to be construed as limiting of the concepts herein. Any suitable number of operators could be deployed in a single VM. For example, if performance of operators B, C and D all exceed one or more of the defined performance thresholds, a single VM could be provisioned with the logic for all of operators B, C and D. In addition, a VM could be provisioned to implement two different unrelated operators. For example, if operators C and F all exceed one or more of the defined performance thresholds, a single VM could be provisioned that implements both operator C and operator F. The disclosure and claims herein expressly extend to any number of virtual machines that implement any suitable number of operators.

As described herein, physical location attributes can be used to determine a preferred virtual machine to deploy operators of a streaming application to optimize the streaming application. When the performance of an operator needs to be improved or optimized, the streams manager in conjunction with a cloud manager may automatically determine one or more preferred virtual machines in a cloud with a specified streams infrastructure to best meet the needs of the underperforming operator or application component based on physical location attributes of candidate the virtual machines. A location for placement of an operator is chosen based on the physical attributes of the physical location. Operators are dynamically migrated to the VM that best meets the needs of the operator to improve performance of the application.

FIG. 10 shows a list 1000 of suitable examples of location attributes 440 shown in FIG. 3. The location attributes 440 may be collected and stored by the cloud manager 350. The suitable physical attributes may include the climate for the physical location of the resource such as "cold", "hot" or "mild". The suitable physical attributes may also include an average cooling cost or a current cooling cost for the location. The suitable physical attributes may relate to the data regulation environment of the physical location. The data regulation environment refers to political, legal or security restrictions related to the physical location. The suitable physical attributes may also include performance attributes such as processing performance, input/output (I/O) performance, and reliability performance. Other physical attribute include security of the VM location and peak demand.

FIG. 11 shows an example of a physical location attributes table 1110. The physical location attributes table 1110 represents an example of the physical location attributes in the list of FIG. 10 that could be stored as physical location attributes 440 shown in FIG. 4. It is understood that the physical location attributes 440 could be stored using a variety of storage methods and structures in addition to the example shown in FIG. 11. In this example, each physical location attribute includes a VM location ID 1112 and one or more fixed attributes 1114 and dynamic attributes 1116. The fixed attributes 1114 are attributes related to the general physical location, and the dynamic attributes 1116 are related to a current attribute of the physical location or a status of a fixed attribute. For example, a first physical location attribute record 1118 has a location ID of VMID1. As shown in the physical location attributes table 1110, the location ID VMID1 corresponds to a fixed attribute of "Cold Climate" and a dynamic attribute of "Current Cost" which indicates the current cooling cost of the physical location corresponding to the physical location ID. Similarly, in the physical location attributes table 1110, the fourth attributes record 1120 has a location ID VMID4 with a fixed attribute of "High I/O Performance" and a dynamic attribute of "Available", which indicates the resources with the high I/O performance are currently available.

Again referring to FIG. 11, the physical location attributes table 1110 may also include a security attribute as shown in the example attribute record 1122. The security attribute indicates a security parameter for the physical location hosting the corresponding virtual machine. For example, the security attribute may indicate a high level of security for the physical location hosting the virtual machine, or may indicate a specific type of security encryption being used or available to be used at the physical location. A corresponding dynamic attribute for a fixed security attribute may indicate the availability of the security resource as shown in the example attribute record 1122. Similarly, the physical location attributes table 1110 may also include a peak demand attribute. The peak demand attribute may indicate a peak demand parameter for the physical location hosting the corresponding virtual machine. For example, the peak demand attribute in attribute record 1124 may be associated with a physical location that has a large peak processing capability that is not always utilized. For example, the physical resources with the peak demand attribute may be located on the other side of the world that has a low utilization at night. The streams manager or cloud manager can select to deploy an operator to this virtual machine at night (night time for the physical location hosting the VM) during times of low utilization. The corresponding dynamic attribute may indicate the physical location has a current low utilization as shown in the example attribute record 1124.

The physical location attributes described with reference to FIG. 11 can be used in conjunction with the location restriction 580 shown in FIG. 5. For example, when the streams manager determines an operator of the streams application that is underperforming it can request resources from the cloud manager while including a location restriction 580 in the cloud resource request 540 (FIG. 5). The cloud manager can then determine a preferred VM in the cloud for deploying the underperforming operator based on physical location attributes and the location restriction 580. The location restriction 580 provides input for the cloud manger to determine a preferred VM based on physical location attributes. Location restrictions are therefore the same as or related to one or more of the physical location attributes in FIG. 10. For example, if the operator were computationally demanding, the location restriction could be set by the streams manager to include a cooling cost restriction. This would instruct the cloud manager to select a physical location for the VM with a physical location attribute with a low current cooling cost. Similarly, a location restriction that indicates an operator processes politically sensitive data that must be performed in a specific political environment would instruct the cloud manager to select a VM with a physical location attribute that indicates the location meets the location restriction for the specific nature of the sensitive data processed by the operator.

Figure 12:
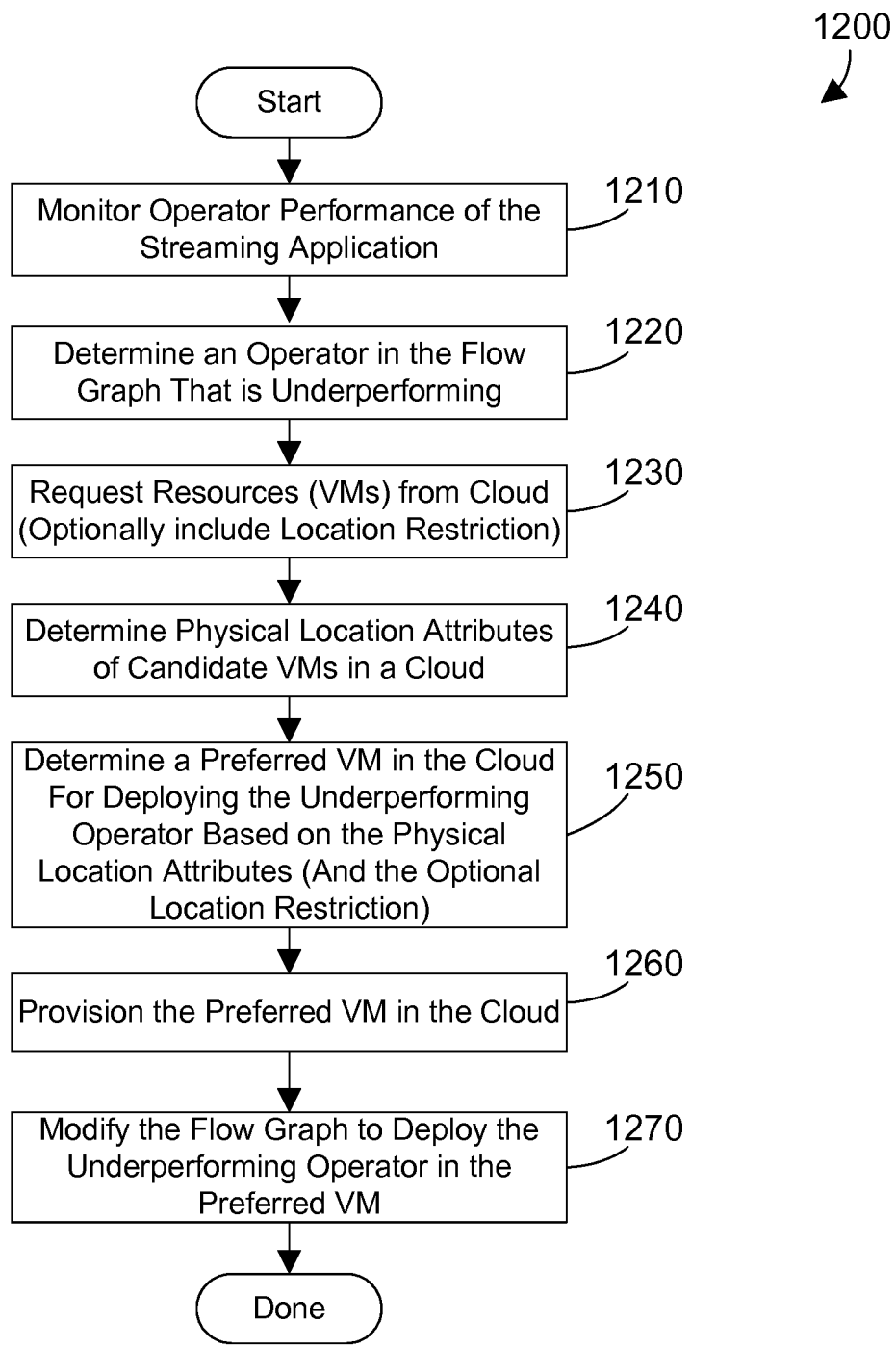
FIG. 12 is a flow diagram of a specific method for deploying an operator to a VM based on physical location attributes determined by a cloud manager.

FIG. 12 shows a first example of a specific method 1200 for enhancing performance of a streaming application by modifying the flow graph so one or more operators of the streaming application are deployed to a preferred virtual machine based on physical location attributes of the preferred virtual machine. In this example, the cloud manger makes the determination of which VM to use to deploy the operator. Note that method 1200 could be one specific implementation for method 600 shown in FIG. 6. The steps of method 1200 are preferably performed by the streams manager 360 interacting with the cloud manager 350 described above. The streams manager monitors operator performance of a streams application (step 1210). The streams manager determines an operator of the streams application that is underperforming (step 1220). The streams manager requests resources from a cloud manager (step 1230). Note the request can optionally include a location restriction. The cloud manager determines physical location attributes of candidate VMs in a cloud (step 1240). The cloud manager determines a preferred VM in the cloud of the candidate VMs for deploying the underperforming operator based on physical location attributes (step 1250). The cloud manager provisions the preferred VM in the cloud (step 1260). The streams manager modifies the flow graph to deploy the underperforming operator in the provisioned, preferred VM (step 1210). The method is then done.

Figure 13:
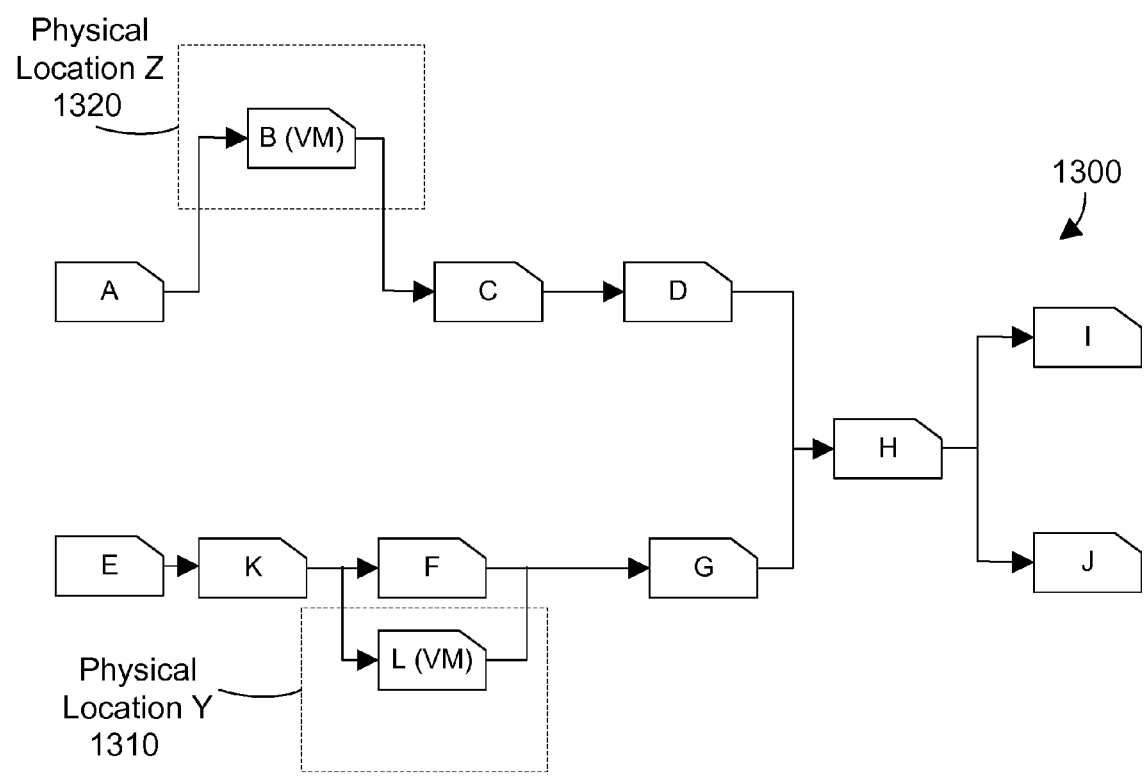
FIG. 13 is a block diagram showing the streaming application in FIG. 8 after the relocation of operators to virtual machines provisioned from a cloud based on physical location attributes.

Another simple example is provided in FIG. 13 to illustrate the concepts discussed above. This example also begins with the stream performance monitor 510 in FIG. 5 monitoring performance of the streaming application 800 in FIG. 8 in accordance with one or more defined performance thresholds 520. In response to the performance of operator F exceeding a defined performance threshold, the streams manager requests cloud resources to relieve the load on operator F. In this example, we assume that the streams manager includes a location restriction 580 (FIG. 5) and requests the cloud manager to provision one or more VMs with streams infrastructure that supports running components of the streaming application and with the logic for operator F (step 1230 in FIG. 12). In response, the cloud manager determines physical location attributes of candidate VMs in the cloud and determines a preferred candidate for deploying operator F based on the physical location attributes and the location restriction (steps 1240 and 1250 in FIG. 12). The cloud manager then provisions a VM with the specified stream infrastructure and with the logic for operator F in the candidate VM (step 1260 in FIG. 12). The streams manager includes the new VM in the set of hosts available to the streaming application and modifies the flow graph so one or more portions of operator F are hosted by the new VM just provisioned (step 1270). The modifications to the flow graph are shown in the streaming application 1300 in FIG. 13 to include a new operator L in the new physical location Y 1310. The new operator K is used to split the tuples coming from operator E into two sets that are distributed to operators L and F as described in the previous example.

FIG. 13 further illustrates another example for enhancing performance of a streaming application by migrating or deploying operators of the streaming application to virtual machines according to attributes of the physical location. In this example, instead of moving a portion of an operator to a new VM, the entire operator is relocated. In this example we assume the stream performance monitor 510 in FIG. 5 in monitoring performance of the streaming application 800 in FIG determined that operator B was underperforming. In response to a request as described above, the cloud manager determines physical location attributes of candidate VM in the cloud and determines a preferred candidate for deploying operator B at physical location Z 1320 based on the physical location attributes and the location restriction (steps 1240 and 1250 in FIG. 12). The streams manager modifies the flow graph so operator B is hosted by the new VM just provisioned (step 1270) in the new physical location Z 1320.

In another example, the streams manager makes the determination of to which VM to deploy the operator to optimize the performance of the cloud application. This is in contrast to the above example where the cloud manager made the determination of the VM. In this example, the communication between the streams manager and the cloud manager is different than the examples described above. The streams manager monitors operator performance of a streams application and determines an operator of the streams application that is underperforming or can be optimized as described above. In addition, the cloud manager determines physical location attributes of VMs in a cloud also in the manner described above. In contrast, in this example the information concerning the physical location attributes is communicated back to the streams manager and the streams manager then determines a preferred VM in the cloud for deploying the underperforming operator based on physical location attributes. The streams manager may also consider whether a preferred VM is already available with the needed physical location attributes. The streams manager then determines if the preferred VM is not already available then the streams manager requests the cloud manager to provision the preferred VM. Provisioning the preferred VM could include provisioning a new VM or resizing an existing VM for the preferred VM. The request by the streams manager for a new VM or resize VM to the cloud manager may be similar to the request described above. If the preferred VM is already available to the streams manager or after the preferred VM is provisioned by the cloud manager, the streams manager modifies the flow graph to deploy the underperforming operator in the preferred VM. After the streams manager modifies the flow graph, the streams manager then sends a notification to the cloud manager that the flow graph has been modified. With this notification, the cloud manager is able to compensate for load balancing changes due to the changes in the flow graph.

Figure 14:
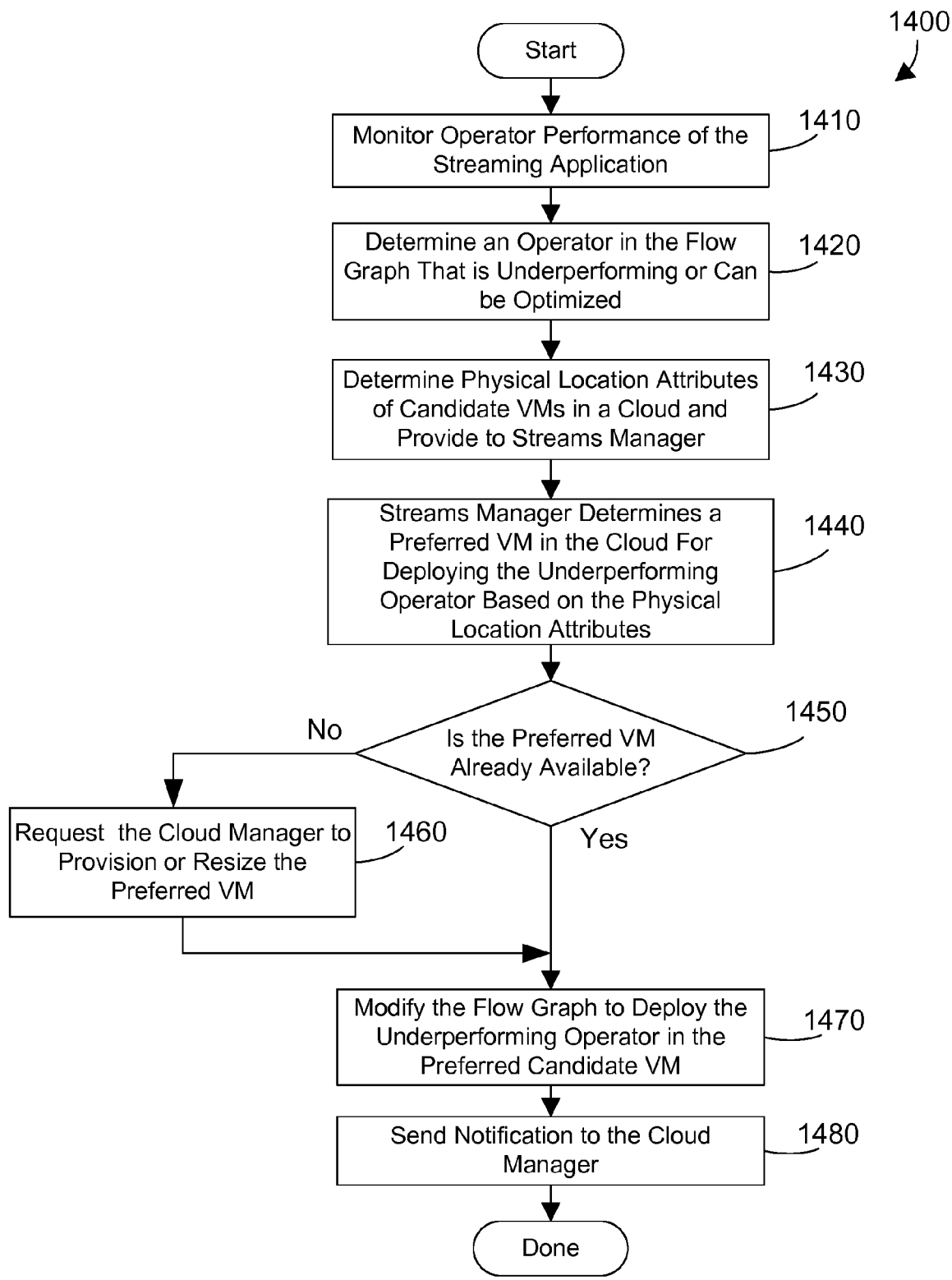
FIG. 14 is a flow diagram of another specific method for deploying an operator to a VM based on physical location attributes determined by a cloud manager.

FIG. 14 shows another suitable example of a specific method 1400 for enhancing performance of a streaming application. Method 1400 illustrates the example described above where the streams manager makes the determination of which VM to deploy the operator to optimize the performance of the cloud application. The steps of method 1400 are preferably performed by the streams manager 360 and the cloud manager 350 described above. The streams manager monitors operator performance of a streams application (step 1410). The streams manager determines an operator of the streams application that is underperforming relative to other operators or can be optimized (step 1420). The cloud manager determines physical location attributes of VMs in a cloud (step 1430) and communicates those physical location attributes to the streams manager. The streams manager determines a preferred VM in the cloud for deploying the underperforming operator based on physical location attributes (step 1440). The streams manager then determines if the preferred VM is already available (step 1450). If the preferred VM is not already available (step 1450=no) then the streams manager requests the cloud manager to provision or resize the preferred VMs in the cloud (step 1260) and the method continues with step 1470. If the preferred VM is already available (step 1450=yes) then the method continues with step 1470. The streams manager modifies the flow graph to deploy the underperforming operator in the preferred candidate VM (step 1470). The streams manager then sends a notification to the cloud manager that the flow graph has been modified to make the cloud manager aware of the change for load balancing (step 1480). The method is then done.

The disclosure and claims herein relate to a streams manager that monitors performance of a streaming application, and when the performance of an operator needs to be improved or optimized, the streams manager in conjunction with a cloud manager automatically determine one or more preferred virtual machines in a cloud with a specified streams infrastructure to best meet the needs of the underperforming operator or application component based on physical location attributes of candidate the virtual machines. The streams manager can then modify the flow graph so one or more operators of the streaming application are deployed to a preferred virtual machine determined according to the physical location attributes of the preferred virtual machine to optimize the application executing in the cloud.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, the cloud described herein could be a multi-cloud environment where the cloud manager is a multi-cloud manager such that the VMs provided to the streams manager are located on different clouds.

The invention claimed is:

1. An apparatus comprising:
   at least one processor;
   a memory coupled to the at least one processor;
   a streaming application residing in the memory and executed by the at least one processor, the streaming application comprising a flow graph that includes a plurality of operators that process a plurality of data tuples;
   a streams manager residing in the memory and executed by the at least one processor, the streams manager monitoring performance of the streaming application, and when the streams manager determines an underperforming operator of the streaming application can be optimized sending a request to a cloud manager to provision at least one virtual machine, wherein the request specifies a location restriction that provides input for the cloud manger to determine a physical location for a preferred virtual machine based on physical location attributes of the preferred virtual machine; and wherein the streams manager modifies the flow graph to move the under-performing operator of the streaming application to a preferred virtual machine based on the physical location attributes of the preferred virtual machine;
   wherein the streams manager requests a cloud manager to provision at least one virtual machine with logic to implement at least one of the plurality of operators, and the cloud manager determines physical locations attributes of candidate virtual machines and determines the preferred virtual machine from the candidate virtual machines based on the physical location attributes, the cloud manager provisions the preferred virtual machine, and the streams manager modifies the flow graph to include the preferred virtual machine in the flow graph of the streaming application; and
   wherein the location restriction indicates an operator processes politically sensitive data that must be performed in a specific political environment and instructs the cloud manager to select a VM with a physical location attribute that meets the location restriction for the specific nature of the sensitive data processed by the operator.

2. An apparatus comprising:
   at least one processor;
   a memory coupled to the at least one processor;
   a streaming application residing in the memory and executed by the at least one processor, the streaming application comprising a flow graph that includes a plurality of operators that process a plurality of data tuples; and
   a streams manager residing in the memory and executed by the at least one processor, the streams manager monitoring performance of the streaming application;
   when the streams manager determines an under-performing operator of the streaming application can be optimized, sending a request to a cloud manager to provision at least one virtual machine;
   wherein the request specifies a location restriction that provides input for the cloud manger to determine a physical location for a preferred virtual machine based on physical location attributes of the preferred virtual machine, wherein the location restriction indicates an operator processes politically sensitive data that must be performed in a specific political environment and instructs the cloud manager to select a VM with a physical location attribute that meets the location restriction for the specific nature of the sensitive data processed by the operator, wherein the physical location attributes include a security attribute of the physical machine hosting the virtual machine that indicates a high level of security for the physical location hosting the virtual machine; and wherein the streams manager modifies the flow graph to move the under-performing operator of the streaming application to a preferred virtual machine based on the physical location attributes of the preferred virtual machine.

3. A computer-readable article of manufacture comprising software stored on a non-transitory computer readable medium, the software comprising:

a streams manager that monitors performance of a streaming application;

when the streams manager determines an under-performing operator of the streaming application can be optimized, the streams manager sends a request to a cloud manager to provision at least one virtual machine, wherein the request specifies a location restriction that provides input for the cloud manger to determine a physical location for a preferred virtual machine based on physical location attributes of the preferred virtual machine;

wherein the streams manager modifies a flow graph to move the under-performing operator of the streaming application to a preferred virtual machine based on physical location attributes of the preferred virtual machine;

wherein the streams manager requests a cloud manager to provision at least one virtual machine with logic to implement at least one of the plurality of operators, and the cloud manager determines physical locations attributes of candidate virtual machines and determines the preferred virtual machine from the candidate virtual machines based on the physical location attributes, the cloud manager provisions the preferred virtual machine, and the streams manager modifies the flow graph to include the preferred virtual machine in the flow graph of the streaming application; and wherein the location restriction indicates an operator processes politically sensitive data that must be performed in a specific political environment and instructs the cloud manager to select a VM with a physical location attribute that meets the location restriction for the specific nature of the sensitive data processed by the operator.

* * * * *